US006858671B2

(12) United States Patent
Damman et al.

(10) Patent No.: US 6,858,671 B2
(45) Date of Patent: Feb. 22, 2005

(54) METHOD OF MANUFACTURE OF POLYESTER MOLDING COMPOSITIONS AND ARTICLES PRODUCED THEREFROM

(75) Inventors: Sebastiaan Bernardus Damman, Leiden (NL); Gerrit de Wit, Ossendrecht (NL)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 10/063,696

(22) Filed: May 8, 2002

(65) Prior Publication Data
US 2003/0216506 A1 Nov. 20, 2003

Related U.S. Application Data

(63) Continuation-in-part of application No. 09/683,230, filed on Dec. 4, 2001, now abandoned.

(51) Int. Cl.$^7$ .......................... C08L 67/02; C08L 79/08
(52) U.S. Cl. ............................. 525/64; 525/66; 525/68
(58) Field of Search .................... 525/64, 66, 68

(56) References Cited

U.S. PATENT DOCUMENTS

| | | | |
|---|---|---|---|
| 2,465,319 A | 3/1949 | Whinfield et al. | |
| 2,901,466 A | 8/1959 | Kibler et al. | |
| 3,018,272 A | 1/1962 | Griffing et al. | |
| 3,047,539 A | 7/1962 | Pengilly | |
| 3,546,008 A | 12/1970 | Shields et al. | 117/138.8 |
| 3,803,085 A | 4/1974 | Takehoshi et al. | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,884,882 A | 5/1975 | Caywood, Jr. | |
| 3,905,942 A | 9/1975 | Takekoshi et al. | |
| 3,972,902 A | 8/1976 | Heath et al. | |
| 3,983,093 A | 9/1976 | Williams, III et al. | |
| 4,097,446 A | 6/1978 | Abolins et al. | |
| 4,141,927 A | 2/1979 | White et al. | |
| 4,147,740 A | 4/1979 | Swiger et al. | |
| 4,174,358 A | 11/1979 | Epstein | 525/183 |
| 4,251,644 A | 2/1981 | Joffrion | 525/64 |
| 4,259,458 A | 3/1981 | Robeson | 525/68 |
| 4,315,086 A | 2/1982 | Ueno et al. | 525/391 |
| 4,346,194 A | 8/1982 | Roura | 525/66 |
| 4,443,591 A | 4/1984 | Schmidt et al. | 528/128 |
| 4,455,410 A | 6/1984 | Giles, Jr. | 525/436 |
| 4,474,927 A | 10/1984 | Novak | 525/66 |
| 4,539,370 A | 9/1985 | Nouvertne et al. | |
| 4,659,760 A | 4/1987 | van der Meer | 524/141 |
| 4,732,938 A | 3/1988 | Grant et al. | 525/92 |
| 4,755,566 A | 7/1988 | Yates, III | 525/391 |
| 4,814,380 A * | 3/1989 | Liu | 525/66 |
| 4,877,848 A | 10/1989 | Maresca | 525/423 |
| 4,908,277 A | 3/1990 | Tsunashima et al. | 528/295 |
| 4,957,980 A | 9/1990 | Kobayashi et al. | 525/423 |
| 5,037,900 A | 8/1991 | Yoshino et al. | 525/423 |
| 5,300,332 A | 4/1994 | Kawaguchi et al. | 525/437 |
| 5,300,572 A | 4/1994 | Tajima et al. | 525/167 |

FOREIGN PATENT DOCUMENTS

| | | |
|---|---|---|
| EP | 0383977 | 8/1990 |
| JP | 63-6271 | 11/1994 |
| JP | 4-77550 | 5/1999 |

* cited by examiner

Primary Examiner—Jeffrey Mullis
(74) Attorney, Agent, or Firm—Oppedahl & Larson LLP

(57) ABSTRACT

A thermoplastic molding composition comprises a resin composition having 50 to about 90 weight percent of a polyester, about 8 to about 48 weight percent of a polyetherimide, about 2 to about 25 weight percent of a high rubber graft impact modifier, each based on the total resin composition, and up to about 15 weight percent of a particulate filler. A making the composition comprises pre-melt compounding a polyester, a polyetherimide, and a high rubber graft impact modifier to form a pre-compounded blend, wherein the pre-compounded blend has a Tg of greater than or equal to about 110° C.; and dry-blending a crystallized polyester with the pre-compounded blend to form the molding composition. Such molding compositions are particularly useful in blow-molding container for liquids such as beer.

12 Claims, No Drawings

METHOD OF MANUFACTURE OF POLYESTER MOLDING COMPOSITIONS AND ARTICLES PRODUCED THEREFROM

CROSS REFERENCE TO RELATED APPLICATIONS

This application claims rights of priority under 35 U.S.C. 119 from U.S. patent application Ser. No. 09/683,230 filed on Dec. 4, 2001, now abandoned, which is fully incorporated herein by reference.

BACKGROUND OF INVENTION

This disclosure relates to thermoplastic polyester compositions and methods for the manufacture thereof, and in particular to blends of polyesters and polyetherimides useful in the manufacture of containers.

Plastic containers, particularly those useful for the containment of liquids, can be made from a variety of thermoplastic polymers, although individual thermoplastic polymers have certain drawbacks. Polyetherimide and polycarbonate compositions, for example, exhibit a high level of oxygen permeability (Encyclopedia of Polymer Science and Technology, N. M. Bikales, Vol. 9, 316–327, Wiley, New York (1965); Kirk-Othmer Encyclopedia of Chemical Technology, $3^{rd}$ ed., M. Grayson, Vol. 3, 480–502 (1978), such that these resins are not practical for applications requiring low oxygen permeability. Thus, while these resins are suitable for use as large size soda bottles, for example, the leak rates are not optimal for smaller size bottles, or for liquids such as beer, which is more sensitive to oxygen and other gases. Multi-layer bottles can be used in order to provide the necessary sealing, but are more expensive and time-consuming to manufacture. Polyester resins have also been used as plastic containers for liquids, but frequently exhibit undesirably high levels of creep, resulting in permanent deformation.

Blends of the foregoing polymers are known. For example, U.S. Pat. No. 4,141,927 discloses a blend of polyetherimide with polyester to lower the melt viscosity of the polyetherimide. U.S. Pat. No. 4,259,458 discloses a blend a polyester and at least one thermoplastic polymer such as a polycarbonate, a styrene resin, an alkyl acrylate resin, a polyurethane, a vinyl chloride polymer, a poly(aryl ether), a copolyetherester block polymer, or a polyhydroxyether. While useful, manufacture and molding of such blends can be difficult, especially when a large proportion of polyester is used. There accordingly remains a need in the art for improved thermoplastic resin compositions and efficient methods for the manufacture of such compositions.

SUMMARY OF INVENTION

A thermoplastic molding composition comprises 50 to about 90 weight percent of a polyester, about 8 to about 48 weight percent of a polyetherimide, about 2 to about 25 weight percent of a high rubber graft impact modifier, each based on the combined total weight of the polyester, the polyetherimide, and the impact modifier; and up to about 15 weight percent of a particulate filler, based on the combined total weight of the composition.

A method for the manufacture of a thermoplastic molding composition comprises melt compounding a blend comprising a polyester, a polyetherimide, a high rubber graft impact modifier, and optionally a particulate filler, wherein the polyetherimide comprises at least about 30 weight percent of the combined total weight of the polyester, the polyetherimide, and the impact modifier, to form a pre-compounded blend; and dry-blending the pre-compounded blend with crystallized polyester to form a thermoplastic molding composition comprising 50 to about 90 weight percent of a polyester, about 8 to about 48 weight percent of a polyetherimide, and about 2 to about 25 weight percent of a high rubber graft impact modifier, each based on the combined total weight of the polyester, the polyetherimide, and the impact modifier, and up to about 15 weight percent of a particulate filler, based on the combined total weight of the composition. The thermoplastic molding composition may then be dried without adversely affecting the physical characteristics of the composition. Alternatively, the pre-compounded blend and the crystalline polyester may be dried separately, and then dry-blended. The dry blend in either embodiment may then be molded to form an article.

A molded article accordingly comprises 50 to about 90 weight percent of a polyester, about 8 to about 48 weight percent of a polyetherimide, and about 2 to about 25 weight percent of a high rubber graft impact modifier, each based on the combined total weight of the polyester, the polyetherimide, and the impact modifier, and up to about 15 weight percent of a particulate filler, based on the combined total weight of the composition.

DETAILED DESCRIPTION

A thermoplastic molding composition with low creep, low oxygen permeability and good impact resistance comprises 50 to about 90 weight percent of a polyester (PE), about 8 to about 48 weight percent of a polyetherimide (PEI), and about 2 to about 25 weight percent of a high rubber graft impact modifier, each based on the combined total weight of the polyester, the polyetherimide, and the impact modifier, and up to about 15 weight percent of a particulate filler, based on the combined total weight of the composition.

An improved thermoplastic composition for molding articles may be unexpectedly obtained by pre-melt compounding a polyester resin, a polyetherimide, a high rubber graft copolymer impact modifier, and optional additives, for example filler, wherein the amount of polyetherimide is selected to impart a glass transition temperature (Tg) greater than or equal to about 110° C. to the pre-compounded blend. In general, compositions comprising at least about 30 weight percent of polyetherimide will have a Tg greater than or equal to about 110° C. This pre-compounded blend is then dry-blended with sufficient additional crystalline polyester to achieve the final desired concentrations of polyester, polyetherimide, impact modifier, and optional additives. Pre-melt compounding allows the pre-compounded blend to be efficiently dried either before dry-blending with the crystalline polyester, or after, at temperatures greater than or equal to the Tg of the final molded article, thereby allowing the incorporation of higher quantities of polyester into polyester-polyetherimide blends, and resulting in molded articles having low oxygen permeability and low creep.

Suitable polyester resins include those derived from an aliphatic, cycloaliphatic, or aromatic diol, or at least one of the foregoing, containing from about 2 to about 10 carbon atoms, and at least one aromatic dicarboxylic acid. Preferred polyesters are derived from an aliphatic diol and an aromatic dicarboxylic acid, and have repeating units of the following general formula (I):

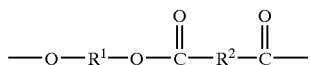

(I)

wherein $R^1$ is an alkyl or cycloaliphatic radical containing 2 to about 12 carbon atoms on average, and which is the residue of a straight chain, branched, or cycloaliphatic alkane diol having 2 to about 12 carbon atoms on average, or chemical equivalents thereof. $R^2$ is an aryl radical having 6 to about 20 carbon atoms, and which is the decarboxylated residue derived from a diacid having 6 to about 20 carbon atoms, or chemical equivalents thereof.

The diol may be a glycol, such as ethylene glycol, propylene glycol, trimethylene glycol, 2-methyl-1,3-propane glycol, hexamethylene glycol, decamethylene glycol, cyclohexane dimethanol, or neopentylene glycol; or a diol such as 1,4-butanediol, hydroquinone, or resorcinol.

Examples of aromatic dicarboxylic acids represented by the decarboxylated residue $R^2$ are isophthalic or terephthalic acid, 1,2-di(p-carboxyphenyl)ethane, 4,4'-dicarboxydiphenyl ether, 4,4' bisbenzoic acid, as well as compositions comprising at least one of the foregoing. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid, naphthalene dicarboxylic acid or compositions comprising at least one of the foregoing dicarboxylic acids.

Also contemplated herein are the above polyesters with minor amounts, e.g., from about 0.5 to about 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

Block copolyester resin components are also useful, and can be prepared by the transesterification of (a) straight or branched chain poly(1,4-butylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. For example a poly(1,4-butylene terephthalate) can be mixed with a polyester of adipic acid with ethylene glycol, and the mixture heated at 235° C. to melt the ingredients, then heated further under a vacuum until the formation of the block copolyester is complete. As the second component, there can be substituted poly (neopentyl adipose), poly(1,6-hexylene azelate-coisophthalate), poly(1,6-hexylene adipate-co-isophthalate) and the like. An exemplary block copolyester of this type is available commercially from General Electric Company, Pittsfield, Mass., under the trade designation VALOX 330.

In one embodiment, the thermoplastic molding compositions comprise, based on the total weight of the molding composition, less than or equal to about 90 weight percent (wt. %) polyester, with less than or equal to about 85 wt. % preferred, and less than or equal to about 80 wt. % more preferred. The thermoplastic molding compositions further comprise greater than or equal to 50 wt. % polyester, with greater than or equal to about 55 wt. % more preferred, and greater then or equal to about 60 wt. % especially preferred, again based on the total weight of the molding composition.

In another embodiment, the thermoplastic molding compositions comprise less than or equal to about 90 weight percent polyester, with less than or equal to about 85 wt. % preferred, and less than or equal to about 80 wt. % more preferred, based on the combined total weight of the polyester, the polyetherimide, and the impact modifier. The thermoplastic molding compositions further comprise greater than or equal to 50 wt. % polyester, with greater than or equal to about 55 wt. % more preferred, and greater then or equal to about 60 wt. % especially preferred, again based on the combined total weight of the polyester, the polyetherimide, and the impact modifier.

Preferred classes of polyetherimides are melt processible, and comprise more than 1, preferably about 10 to about 1000 or more, and more preferably from about 10 to about 500 structural units, of the formula (II)

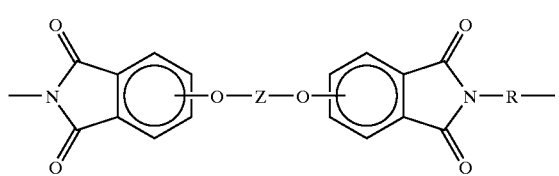

(II)

wherein the divalent bonds of the —O—Z—O— group are in the 3,3', 3,4', 4,3', or the 4,4' positions, and wherein Z includes, but is not limited to, divalent radicals of formula (III):

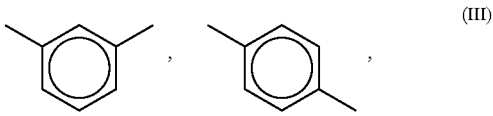

(III)

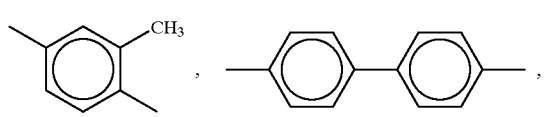

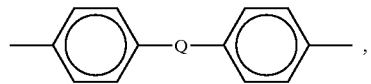

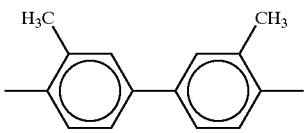

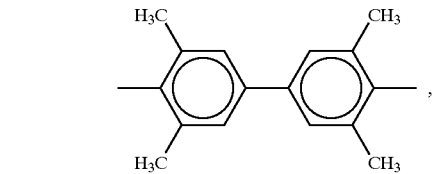

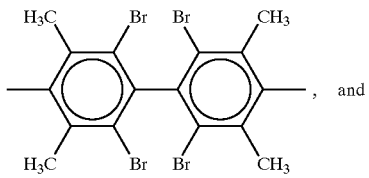

, and

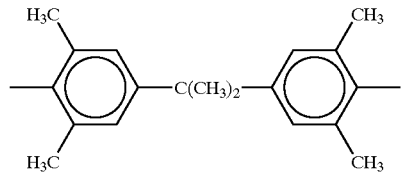

or of formula (IV)

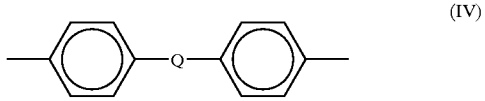

(IV)

wherein Q includes but is not limited to a divalent moiety selected from the group consisting of —O—, —S—, —C(O)—, —SO$_2$—, —C$_y$H$_{2y}$-(y being an integer from 1 to 5), and halogenated derivatives thereof, including perfluoroalkylene groups.

R in formula (II) includes but is not limited to substituted or unsubstituted divalent organic radicals such as aromatic hydrocarbon radicals having 6 to about 20 carbon atoms and halogenated derivatives thereof; straight or branched chain alkylene radicals having 2 to about 20 carbon atoms; cycloalkylene radicals having 3 to about 20 carbon atoms, or divalent radicals of the general formula (IV) as described above.

In one embodiment, the polyetherimide may be a copolymer which, in addition to the etherimide units described above, further contains polyimide structural units of the formula (V)

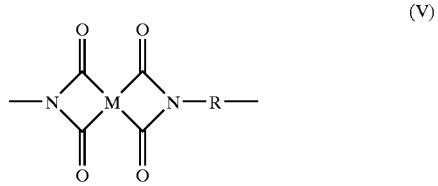

(V)

wherein R is as described above and M includes, but is not limited to, radicals of formula (VI).)

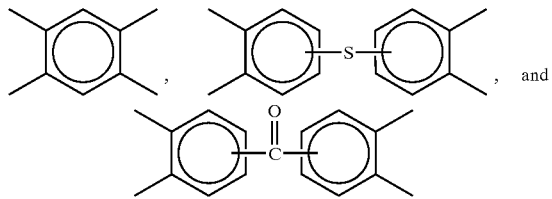

(VI)

, and

The polyetherimides and polyetherimide-polyimide copolymers can be prepared by methods known to those skilled in the art, including the reaction of an aromatic bis (ether anhydride) of the formula (VII)

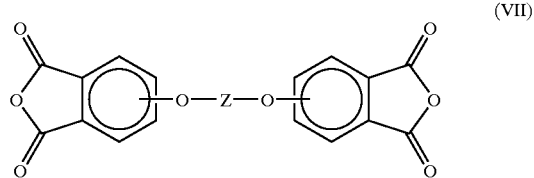

(VII)

and optionally a bis(anhydride of formula (VIII)

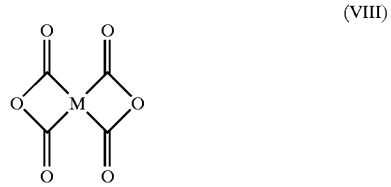

(VIII)

with an organic diamine of the formula (IX) H$_2$N—R—NH$_2$ (IX) wherein Z, M, and R are defined as above.

Examples of specific aromatic bis(ether anhydride)s and organic diamines are disclosed, for example, in U.S. Pat. Nos. 3,972,902 and 4,455,410. Illustrative examples of aromatic bis(ether anhydride)s of formula (VII) include 2,2-bis[4-(3,4-dicarboxyphenoxy)phenyl]propane dianhydride; 4,4'-bis(3,4-dicarboxyphenoxy) diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy) phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy) diphenyl sulfone dianhydride; 4-(2, 3-dicarboxyphenoxy)-4'-(3,4-dicarboxyphenoxy) diphenyl-2,2-propane dianhydride; 4-(2,3-dicarboxyphenoxy)-4'-(3, 4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures comprising at least one of the foregoing. The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Examples of suitable diamines (IX) are ethylenediamine, propylenediamine, trimethylenediamine, diethylenetriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methyl-heptamethylenediamine, 4,4-dimethylheptamethylenediamine, 4-methylnonamethylenediamine, 5-methylnonamethylenediamine, 2,5-dimethylheptamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis (b-amino-t-butyl)toluene, bis(p-b-amino-t-butylphenyl) ether, bis(p-b-methyl-o-aminophenyl)benzene, bis(p-b-methyl-o-aminopentyl)benzene, 1,3-diamino-4-isopropylbenzene, bis(4-aminophenyl)sulfide, bis (4-aminophenyl)sulfone, bis(4-aminophenyl)ether and 1,3-bis(3-aminopropyl)tetramethyldisiloxane. Mixtures of these compounds may also be present. The preferred diamines are aromatic diamines, especially m- and p-phenylenediamine, and mixtures comprising at least one of the foregoing.

In a particularly preferred embodiment, the polyetherimide resin comprises structural units according to formula (II) wherein each R is independently p-phenylene or m-phenylene or a combination of at least one of the foregoing and Z is a divalent radical of the formula (X)

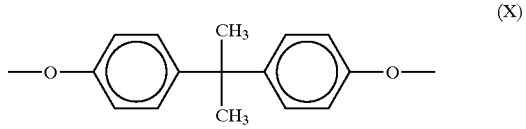

(X)

The reactions to prepare the polyetherimides can be carried out employing solvents such as o-dichlorobenzene, m-cresol/toluene and the like, to effect a reaction between the aromatic bis(ether anhydride) and diamine at temperatures of about 100° C. to about 250° C. Alternatively, the polyetherimide can be prepared by melt polymerization of aromatic bis(ether anhydride) and diamine by heating a mixture of the starting materials to elevated temperatures, for example about 100° C. to about 500° C. with concurrent stirring. Chain stoppers and branching agents may also be employed in the reaction. When polyetherimide/polyimide copolymers are employed, a dianhydride, such as pyromellitic anhydride, is used in combination with the bis(ether anhydride). The polyetherimide resins can optionally be prepared from reaction of an aromatic bis(ether anhydride) with an organic diamine in which the diamine is present in the reaction mixture at no more than about 0.2 molar excess, and preferably less than about 0.2 molar excess. Under such conditions the polyetherimide resin has less than about 15 microequivalents per gram (microeq/g) acid titratable groups, and preferably less than about 10 microeq/g acid titratable groups, as shown by titration with chloroform solution with a solution of 33 weight percent hydrobromic acid in glacial acetic acid. Acid-titratable groups are essentially due to amine end-groups in the polyetherimide resin.

Generally, useful polyetherimides have a melt index of about 0.1 to about 10 grams per minute (g/min), as measured by American Society for Testing Materials (ASTM) D 1238 at 295° C., using a 6.6 kilogram (kg) weight. In a preferred embodiment, the polyetherimide resin has a weight average molecular weight (Mw) of from about 10,000 to about 150,000 grams per mole (g/mole), as measured by gel permeation chromatography, using a polystyrene standard. Such polyetherimide resins typically have an intrinsic viscosity greater than about 0.2 deciliters per gram, preferably about 0.35 to about 0.7 deciliters per gram measured in m-cresol at 25° C. Some such polyetherimides include, but are not limited to ULTEM® 1000 (number average molecular weight (Mn) 21,000; weight average molecular weight 54,000; dispersity 2.5), ULTEM® 1010 (Mn 19,000; Mw 47,000; dispersity 2.5), ULTEM® 1040 (Mn 12,000; Mw 34,000–35,000; dispersity 2.9), or at least one of the foregoing.

Polyetherimides are present in the composition in one embodiment in amounts less than or equal to about 48 wt. %, with less than or equal to about 40 wt. % preferred, and less than or equal to about 30 wt. % more preferred, based on the combined total weight of the composition. Also preferred is an amount of polyetherimide greater than or equal to about 8 wt. %, with greater than or equal to about 15 wt. % more preferred, and greater than or equal to about 20 wt. % especially preferred, all based on the combined total weight of the composition.

In another embodiment, polyetherimides are present in amounts less than or equal to about 48 wt. %, with less than or equal to about 40 wt. % preferred, and less than or equal to about 30 wt. % more preferred, all based on the combined total weight of the polyester, polyetherimide, and impact modifier. Also preferred is an amount of polyetherimide greater than or equal to about 8 wt. %, with greater than or equal to about 15 wt. % more preferred, and greater than or equal to about 20 wt. % especially preferred, all based on the combined total weight of the polyester, polyetherimide, and impact modifier.

The impact modifier is a graft polymer having a high rubber content, i.e., greater than 40 wt. %, preferably greater than about 50 wt. % of the graft polymer. The rubber is preferably present in an amount less than about 95 wt. %, preferably less than about 90 wt. % of the graft polymer.

The rubber forms the backbone of the graft polymer, and is preferably a polymer of a conjugated diene having the formula (XI)

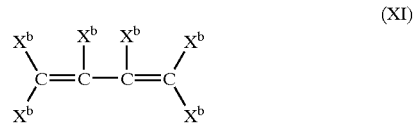

(XI)

wherein $X^b$ is hydrogen, C—C alkyl, chlorine, or bromine. Examples of dienes that may be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing dienes, and the like. A preferred conjugated diene is butadiene. Copolymers of conjugated dienes with other monomers may also be used, for example copolymers of butadiene-styrene, butadiene-acrylonitrile, and the like.

Alternatively, the backbone may be an acrylate rubber, such as one based on n-butyl acrylate, ethylacrylate, 2-ethylhexylacrylate, mixtures comprising at least one of the foregoing, and the like. Additionally, minor amounts of a diene may be copolymerized in the acrylate rubber backbone to yield improved grafting.

After formation of the backbone polymer, a grafting monomer is polymerized in the presence of the backbone polymer. One preferred type of grafting monomer is a monovinylaromatic hydrocarbon having the formula (XII):

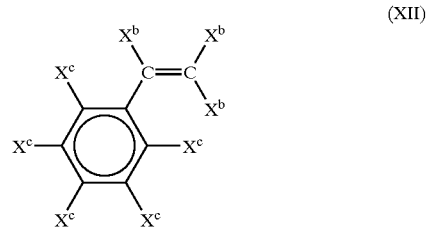

(XII)

wherein $X^b$ is as defined above and $X^c$ is hydrogen, $C_1$–$C_{10}$ alkyl, $C_1$–$C_{10}$ cycloalkyl, $C_1$–$C_{10}$ alkoxy, $C_6$–$C_{18}$ alkyl, $C_6$–$C_{18}$ aralkyl, $C_6$–$C_{18}$ aryloxy, chlorine, bromine, and the like. Examples include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, mixtures comprising at least one of the foregoing compounds, and the like. The preferred monovinylaromatic hydrocarbons are styrene and/or alpha-methylstyrene.

A second type of grafting monomer that may be polymerized in the presence of the polymer backbone are acrylic monomers of formula (XIII):

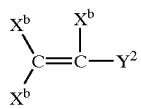

wherein $X^b$ is as previously defined and $Y^2$ is cyano, $C_1-C_{12}$ alkoxycarbonyl, or the like. Examples of such acrylic monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like. Preferred monomers include acrylonitrile, ethyl acrylate, and methyl methacrylate.

A mixture of grafting monomers may also be used, to provide a graft copolymer. Preferred mixtures comprise a monovinylaromatic hydrocarbon and an acrylic monomer. Preferred graft copolymers include acrylonitrile-butadiene-styrene (ABS) and methyl methacrylate-butadiene-styrene (MBS) resins. Suitable high-rubber acrylonitrile-butadiene-styrene resins are available from General Electric Company as BLENDEX® grades 131, 336, 338, 360, and 415.

Most preferably, the high rubber graft impact modifier is in the form of a core-shell polymer built up from a rubber-like core on which one or more shells have been grafted. The core therefore consists substantially of an acrylate rubber or a butadiene rubber, and the shell(s) preferably comprise a vinylaromatic compound and/or a vinylcyanide and/or an alkyl(meth)acrylate. The core and/or the shell(s) often comprise multi-functional compounds that may act as a cross-linking agent and/or as a grafting agent. These polymers are usually prepared in several stages.

The impact modifiers are used to enhance the impact characteristics of the composition, but preferably do not substantially affect the creep. In one embodiment, suitable amounts of impact modifiers are less than or equal to about 25 wt. %, preferably less than or equal to about 20 wt. %, and more preferably less than or equal to about 15 wt. % of the total composition. The impact modifier comprises greater than or equal to about 2 wt. %, preferably greater than or equal to 5 wt. % of the composition.

In another embodiment, suitable amounts of impact modifiers are less than or equal to about 25 wt. %, preferably less than or equal to about 20 wt. %, and more preferably less than or equal to about 15 wt. % of the combined total weight of the polyester, polyetherimide, and impact modifier. The impact modifier comprises greater than or equal to about 2 wt. %, preferably greater than or equal to 5 wt. % of the combined total weight of the polyester, polyetherimide, and impact modifier.

Optionally, the thermoplastic composition further contains, based on the total weight of the composition, up to about 15 wt. %, preferably no more than about 10 wt. % of a particulate inorganic filler, in order to impart desired processing and physical characteristics to the molding composition. Such characteristics include thermal stability, increased density, stiffness, lower creep, and texture. Typical inorganic fillers include but are not limited to alumina, amorphous silica, anhydrous aluminum silicates, mica, feldspar, clays, talc, glass flake, glass fibers, glass microspheres, wollastonite, metal oxides such as titanium dioxide, zinc sulfide, ground quartz, and the like. Preferred inorganic fillers include zinc oxide, barium sulfate and fiberglass, or at least one of the foregoing. Barium sulfate may be in the form of the naturally occurring barites or as synthetically derived barium sulfate. The largest dimension of the particles may vary, and can be less than or equal to about 50 micrometers, with less than or equal to about 15 micrometers preferred, and less than or equal to about 10 micrometers more preferred. Also preferred is maximum dimension of greater than or equal to about 0.1 micrometers, with greater than or equal to about 1 micrometer more preferred, and greater then or equal to about 2 micrometers especially desired.

Other additives, for example stabilizers and pigments, may also be present in the compositions in minor amounts (e.g., less than about 2 wt. % of the total composition) as is known in the art.

Standard techniques for the manufacture and processing of the above-described molding compositions have drawbacks because of the relatively high amounts (greater than 50 wt. %) of polyesters such as polyethyleneterephthalate in the compositions. A major drawback is that the low softening point of these compositions, makes it difficult to dry the molding compositions prior to molding without concomitant softening and subsequent sticking of the pellets of the molding composition. Another drawback is that drying at low temperatures (e.g., 80° C.) is time-consuming (e.g., up to and exceeding 16 hours). It has unexpectedly been found that the problem of drying such molding compositions can be solved by formulating a pre-compounded blend of a polyester, polyetherimide and impact modifier to have a Tg greater than bout 110° C., and then dry-blending the pre-compounded blend with a crystalline polyester. Use of such pre-compounded blends allows efficient and effective drying either before or after dry blending to form the molding composition.

A suitable pre-compounded blend is obtainable by pre-melt compounding a polyester, a polyetherimide, and a high rubber graft impact modifier to form the pre-compounded blend, wherein the polyetherimide is present in an amount effective to provide the pre-compounded blend with a Tg greater than about 110° C., and preferably greater than about 120° C. While the relative quantities of polyester, polyetherimide, and impact modifier to attain a higher Tg may be readily determined by one of ordinary skill in the art, in general, it has been found that an effective quantity of polyetherimide is greater than or equal to about 30 wt. %, or greater than or equal to about 40 wt. % of the total weight of the resin portion of the pre-compounded blend.

The polyester, polyetherimide, and high rubber graft impact modifier may be dry-blended or melt-blended prior to pre-compounding. The pre-compounded blend may further comprise an optional inorganic filler or other additives such as stabilizers and/or pigments. These additives may be incorporated prior to pre-melt compounding, during pre-melt compounding, or at any point thereafter. Preferably, additives other than the optional fillers are incorporated prior to pre-melt compounding, and the optional fillers are added during pre-melt compounding or after pre-melt-compounding.

The pre-compounded blend may then be dried, preferably at a temperature lower than the Tg of the pre-compounded blend. For example, if the Tg of the pre-compounded blend is 120° C. drying may be effected at 110° C., and then dry-blended with an amount of crystallized polyester (preferably itself dried) sufficient to provide the desired final concentration of polyester, polyetherimide, and impact modifier in the molding composition. This dry-blended composition may then be directly molded without additional drying.

Alternatively, the pre-compounded blend is not dried, but is dry-blended with an amount of crystallized polyester sufficient to provide the desired final concentration of polyester, polyetherimide, and impact modifier in the molding composition.

The dry-blended composition containing crystalline polyester is then dried to form a molding composition. Drying is at a temperature lower than the Tg of the pre-compounded blend. The drying temperature is furthermore generally higher than the Tg of the molded composition. The Tg of the molded composition will be lower than the Tg of the pre-compounded blend, because the molded composition contains more polyester than the pre-compounded blend.

After drying, the molding composition may then be molded to form an article such as a container for liquids. Such articles are readily manufactured, and have low oxygen permeability and low creep. The molding compositions are particularly suitable for the manufacture of large size soda bottles as well as small size bottles, i.e., individual serving size bottles, and for use with a variety of liquids, for example carbonated beverages, cider, fruit juice, dairy-based beverages such as liquid milk, mineral water, still soft drinks, wines and spirits. They are particularly desirable as plastic containers for liquids such as beer, which is sensitive to oxygen.

The invention is further illustrated by the following non-limiting examples.

EXAMPLES

Comparative formulations were dry blended and then compounded on a WP25 extruder at 300 rpm and 24 kg/hr at a maximum temperature of 265° C.-275° C. Polyester/polyetherimide formulations were dry-blended, then melt-compounded in a WP25 extruder at about 300° C. to about 325° C. with a screw speed of 350 pm and a rate of 35 kilograms per hour (kg/hr). For formulations comprising mineral fillers or glass fibers, the fillers or fibers were added down-stream, into the extruder. All examples as shown in the Table except for Example 5 were dried step-wise starting at 100° C. to avoid too much sticking of the granulate due to softening, and then finally at 120° C. for at least 4 hours prior to molding. Drying of the samples in this way was cumbersome, because the pellets started to stick to each other and it was needed to break them up by hand. Drying at 80° C. was found to be possible as well, but this method has the disadvantage that it takes at least 16 hours. Example 5, which has the same formulation as Example 4, was formed by blending of a pre-compounded blend (comprising 50% PET, 40% PEI-1010, and 10% ABS-338) and crystallized PET. This example was dried directly at 120° C. for at least 4 hours prior to molding. All Examples were molded using an Engel 75 ton machine using a melt temperature of about 310° C. and a mold temperature of about 60° C.

In the examples below, the polyethylene terephthalate (PET) had a melt volume rate (MVR) of 20 cc/10 min at 280° C./2.16 kg and was supplied by Eastman Kodak under the trade name EASTAPAK PET 9921W. The polybutylene terephthalate (PBT) had a MVR of 10 cc/10 min. at 250° C./2.16 kg and was supplied by GE Plastics under the trade name PBT-315. The PBT-195 was supplied by General Electric Plastics and had a MVR of 105 cc/10 min at 250° C./2.16 kg.

The high graft rubber acrylonitrile-butadiene-styrene (ABS-338) was supplied by General Electric Plastics under the name BLENDEX 338 and had a polybutadiene content of 70 wt. %, or under the name Blendex 333, with a polybutadiene content of 52 wt. % (ABS-333). The polyetherimide (PEI-1010) was supplied by General Electric Plastics under the trade name ULTEM 1010 and had a MVR of 25 cc/10 min. at 360° C./5.0 kg. The talc filler was supplied by Keyser & Mackay under the name MICROTUFF AG609 and had an average particle size of 0.8 micrometers. The glass fiber filler was supplied by NEG under the name NEG T-120 type glass.

Flexed Plate Impact (FPI) was measured in accordance with ISO 6603-2. Tensile measurements were made according to ISO 527. The Tensile Creep was measured according to ISO 899-1. All creep values were obtained by testing the formulations at 50° C. at 16 MPa during a 24 hour period. Particular formulations and results are shown in the Table below:

| | Sample No. | | | | | | | | | | |
|---|---|---|---|---|---|---|---|---|---|---|---|
| | A* | B* | C* | 1 | 2 | 3 | 4 | 5 | 6 | 7 | 8 |
| Component | | | | | | | | | | | |
| PET | 100 | 94.5 | 20 | 90 | 80 | 60 | 75 | 75 | 75 | — | — |
| PBT-195 | — | — | 35 | — | — | — | — | — | — | — | — |
| PBT-315 | — | — | 30 | — | — | — | — | — | — | 75 | 75 |
| PEI-1010 | — | — | — | 10 | 20 | 40 | 20 | 20 | 20 | 20 | 20 |
| Glass | — | — | 15 | — | — | — | — | — | — | — | — |
| Talc | — | 5.5 | — | — | — | — | — | — | — | — | — |
| ABS-338 | — | — | — | — | — | — | 5 | 5 | — | 5 | — |
| ABS-333 | — | — | — | — | — | — | — | — | 5 | — | 5 |
| Properties | | | | | | | | | | | |
| Creep, % | 2.5 | 0.4 | 0.4 | 0.95 | 0.6 | 0.3 | 0.6 | 0.6 | 0.3 | 0.7 | 0.5 |
| FPI-Energy at Break, Joules | 18 | 7 | 8 | 41 | 65 | 79 | 155 | 152 | 154 | 142 | 144 |
| FPI-Deflection at Break, mm | 66 | 6 | 9 | 13 | 15 | 12 | 28 | 27 | 29 | 27 | 27 |
| Tensile Modulus, Mpa | 2400 | 3400 | 6200 | 2500 | 2600 | 2900 | 2500 | 2500 | 2600 | 2500 | 2500 |
| Tensile Elongation at Break, % | 175 | 6 | 3 | 40 | 200 | 50 | 110 | 72 | 64 | 8 | 43 |

*Comparative Examples

Comparative example A shows that a formulation comprising only PET exhibits a creep of greater than 1%. Creep is lowered by the addition of inorganic fillers such as talc or glass fibers, as shown by comparative examples B and C. However, favorable impact and elongational behavior are also diminished. Addition of PEI resulted in an unexpectedly enhanced creep performance and flexed plate impact resistance. The presence of additional impact modifier increased the impact resistance while maintaining low creep. Furthermore, it was observed that Example 5, which was processed using a pre-compounded blend, could be dried directly at a higher temperature (120° C.) without softening.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for the manufacture of a molding composition, comprising pre-melt compounding a blend polyester portion, a polyetherimide, and a high rubber graft impact modifier to form a pre-compounded blend, wherein the pre-compounded blend has a Tg greater than or equal to about 100° C.; and dry-blending a crystallized polyester portion with the pre-compounded blend to form a molding composition comprising 50 to about 90 wt % of total polyester, said total polyester including both the blend polyester portion and the crystallized polyester portion;

about 10 to about 48 wt % of the polyetherimide; and about 2 to about 25 wt % of the high rubber graft impact modifier, each based on the total combined weight of the total polyester, the polyetherimide, and the impact modifier.

2. The method of claim 1, further comprising drying the pre-compounded blend at a temperature less than or equal to the Tg of the pre-compounded blend.

3. The method of claim 1, further comprising drying the molding composition at a temperature less then or equal to the Tg of the pre-compounded blend.

4. The method of claim 1, wherein the Tg of the pre-compounded blend is greather than about 120° C.

5. The method of claim 1, wherein the polyetherimide comprises greater than or equal to about 30 wt % of the pre-compounded blend, based on the total combined weight of the blend polyester portion, the polyetherimide, and the impact modifier in the pre-compounded blend.

6. The method of claim 1, wherein the polyetherimide comprises greater than or equal to about 40 wt % of the pre-compounded blend, based on the total combined weight of the blend polyester portion, the polyetherimide, and the impact modifier in the pre-compounded blend.

7. A method of molding an article, comprising dry blending a crystallized polyester portion with a pre-compounded blend having a Tg of greater than or equal to about 100° C., said pre-compounded blend comprising a blend polyester portion, a polyetherimide, and a high rubber graft impact modifier, to form a molding composition comprising 50 to about 90 wt % of total polyester, said total polyester including both the blend polyester portion and the crystallized polyester portion; about 10 to about 48 wt % of the polyetherimide; and about 2 to about 25 wt % of the high rubber graft impact modifier, each based on the total combined weight of the total polyester, the polyetherimide, and the impact modifier; and molding the molding composition to form an article having a Tg lower than the Tg of the pre-compounded blend.

8. The method of claim 7, further comprising drying the pre-compounded blend at a temperature less than or equal to the Tg of the pre-compounded blend.

9. The method of claim 7, further comprising drying the molding composition at a temperature less than or equal to the Tg of the pre-compounded blend.

10. The method of claim 7, wherein the Tg of the pre-compounded blend is greather than about 120° C.

11. The method of claim 7, wherein the polyetherimide comprises greater than or equal to about 30 wt % of the pre-compounded blend, based on the total combined weight of the blend polyester portion, the polyetherimide, and the impact modifier in the pre-compounded blend.

12. The method of claim 7, wherein the polyetherimide comprises greater than or equal to about 40 wt % of the pre-compounded blend, based on the total combined weight of the blend polyester portion, the polyetherimide, and the impact modifier in the pre-compounded blend.

* * * * *